US009410500B2

(12) United States Patent
Caruel et al.

(10) Patent No.: US 9,410,500 B2
(45) Date of Patent: Aug. 9, 2016

(54) MOVABLE CASCADE TURBOJET THRUST REVERSER HAVING TRANSLATABLE REVERSER COWL CAUSING VARIATION IN JET NOZZLE

(71) Applicant: AIRCELLE, Gonfreville l'Orcher (FR)

(72) Inventors: Pierre Caruel, Le Havre (FR); Peter Segat, Le Havre (FR)

(73) Assignee: AIRCELLE, Gonfreville l'Orcher (*) Notice: Subject to any disclaimer, the term of this patent is extended or adjusted under 35 U.S.C. 154(b) by 52 days.

(21) Appl. No.: 14/173,464

(22) Filed: Feb. 5, 2014

(65) Prior Publication Data
US 2014/0319243 A1  Oct. 30, 2014

Related U.S. Application Data

(63) Continuation of application No. PCT/FR2012/051581, filed on Jul. 5, 2012.

(30) Foreign Application Priority Data

Aug. 5, 2011 (FR) ...................................... 11 57193

(51) Int. Cl.
F02K 1/72 (2006.01)
F02K 1/56 (2006.01)
(Continued)

(52) U.S. Cl.
CPC . F02K 1/566 (2013.01); F02K 1/09 (2013.01); F02K 1/32 (2013.01); F02K 1/72 (2013.01); Y02T 50/671 (2013.01)

(58) Field of Classification Search
CPC ............... F02K 1/09; F02K 1/30; F02K 1/32; F02K 1/16; F02K 1/64; F02K 1/68; F02K 1/70; F02K 1/72
See application file for complete search history.

(56) References Cited

U.S. PATENT DOCUMENTS 4,922,713 A * 5/1990 Barbarin et al. ............. 60/226.2
5,655,360 A * 8/1997 Butler ......................... 60/226.2
5,778,659 A * 7/1998 Duesler et al. .............. 60/226.1
(Continued)

FOREIGN PATENT DOCUMENTS

FR   2 902 839 A1   12/2007
FR   2 908 468 A1    5/2008
(Continued)

OTHER PUBLICATIONS

International Search Report issued in International Application No. PCT/FR2012/051581.

Primary Examiner — Phutthiwat Wongwian
Assistant Examiner — Marc Amar
(74) Attorney, Agent, or Firm — Burris Law, PLLC

(57) ABSTRACT

The thrust reverser includes a reverser cowl of which a downstream part of the reverser cowl forms a jet nozzle, cascade vanes fixed upstream from the reverser cowl, thrust reverser flaps, and an actuator. The thrust reverser is translatable under an effect of the actuator between a folded position of the thrust reverser flaps for operation of the nacelle in a direct jet mode, and a deployed position of the thrust reverser flaps for operation of the nacelle in a reverse jet mode. In particular, the stretching of the actuator results in causing a variation in a nozzle section of the jet nozzle as long as the stretching is below a predetermined value, and exposing the cascade vanes and deploying the thrust reverser flaps so as to perform the reverse jet mode beyond the predetermined value.

6 Claims, 5 Drawing Sheets

(51) Int. Cl.
  *F02K 1/32* (2006.01)
  *F02K 1/09* (2006.01)

(56) References Cited

U.S. PATENT DOCUMENTS

| | | | |
|---|---|---|---|
| 6,216,980 B1 * | 4/2001 | Baudu et al. | 244/110 B |
| 2008/0010969 A1 * | 1/2008 | Hauer et al. | 60/204 |
| 2008/0110153 A1 * | 5/2008 | Seda et al. | 60/226.2 |
| 2009/0151320 A1 * | 6/2009 | Sternberger | 60/226.2 |
| 2010/0139242 A1 * | 6/2010 | Vauchel et al. | 60/226.2 |
| 2010/0212286 A1 * | 8/2010 | West | F02K 1/32 60/226.2 |

FOREIGN PATENT DOCUMENTS

| | | | | |
|---|---|---|---|---|
| FR | 2 929 998 A1 | 10/2009 | | |
| GB | 2156004 A | * 10/1985 | | F02K 1/56 |
| WO | 2008/045072 A1 | 4/2008 | | |

* cited by examiner

MOVABLE CASCADE TURBOJET THRUST REVERSER HAVING TRANSLATABLE REVERSER COWL CAUSING VARIATION IN JET NOZZLE

CROSS-REFERENCE TO RELATED APPLICATIONS

This application is a continuation of International Application No. PCT/FR2012/051581, filed on Jul. 5, 2012, which claims the benefit of FR 11/57193, filed on Aug. 5, 2011. The disclosures of the above applications are incorporated herein by reference.

FIELD

The present disclosure relates to a turbojet engine nacelle comprising a thrust reverser device.

BACKGROUND

The statements in this section merely provide background information related to the present disclosure and may not constitute prior art.

An aircraft is moved by several turbojet engines each housed in a nacelle. The nacelle generally has a tubular structure comprising an air intake upstream from the turbojet engine, a middle section designed to surround a fan of the turbojet engine, a downstream section housing the thrust reverser means and designed to surround the turbojet engine combustion chamber, and generally ends with a jet nozzle situated downstream from the turbojet engine.

This nacelle is designed to house a dual flow turbojet engine capable of using the rotating fan blades to generate a hot air flow, coming from the combustion chamber of the turbojet engine, and a cold air flow that circulates outside the turbojet engine through an annular channel that is called the tunnel.

During landing of the aircraft, the thrust reverser device is designed to improve the braking capacity thereof by reorienting at least part of the thrust generated by the turbojet engine forward.

In this phase, the thrust reverser device obstructs the cold air flow tunnel and orients the latter flow toward the front of the nacelle, thereby generating a counterthrust that is added to the braking of the wheels of the aircraft, the means implemented to perform this reorientation of the cold air flow varying depending on the type of reverser.

In general, the structure of a reverser comprises a reverser cowl movable between a deployed position, in which it opens a passage in the nacelle designed for the deflected air flow, on the one hand, and a retracted position, in which it closes the passage, on the other hand.

In the case of a cascade reverser, the reorientation of the flow of air is done by cascade vanes, associated with reverser flaps, the cowl serving only to slide so as to expose or cover said cascade vanes. The reverser flaps form blocking doors that can be activated by the sliding of the cowl, causing closing of the tunnel downstream from the vanes, so as to optimize the reorientation of the cold air flow. In a known manner, the cascade vanes are attached to the casing of the turbojet engine and the middle section of the nacelle using a front frame.

Also known are thrust reversers in which the cascade vanes are movable and translate with the reverser cowl during thrust reversal phases.

Irrespective of the type of reverser, a recurring problem is that the dimensions of the nacelle and the associated cowl are too large.

In fact, the length of the vanes necessary for the flow deflection is determined by the flow passing through the tunnel.

For dual flow turbojet engine nacelles with high dilution rates, this means that the length of the vanes must be considerable.

Due to aerodynamic constraints, they also occupy a certain volume inside the thrust reverser cowl, which can create significant dimensions of the thrust reverser cowl and the nacelle.

There is thus a need to limit the dimensions of the cowl and the nacelle and, consequently, to reduce the mass and the aerodynamic drag of the latter.

One of the well-known advantages of thrust reversers in which the cascade vanes are movable is to reduce the axial length of the nacelle and the associated cowl, causing a reduction in the mass and drag.

Furthermore, aside from its thrust reversal function, the reverser cowl belongs to the rear section of the nacelle and has a downstream part forming the jet nozzle aiming to channel the discharge of the airflows.

The optimal section of the jet nozzle may be adapted based on different flight phases, i.e., the takeoff, ascent, cruising, descent, and landing phases of the aircraft. It is associated with an actuating system making it possible to vary and optimize its section as a function of the flight phase of the aircraft at that time. The variation of that section, illustrating the section variation of the cold air flow tunnel, is done by partial translation of the reverser cowl.

A device is known according to document U.S. Pat. No. 5,655,360, which describes a thrust reverser with fixed cascade vanes comprising a moving cowl forming a jet nozzle in its downstream part, the thrust reverser being provided with a device making it possible to vary the section of the nozzle so as to preserve an optimal configuration based on the flight phases.

The already well-known advantages of variable section nozzles are in particular the reduction in noise or decrease in fuel consumption.

SUMMARY

The present disclosure provides a device capable of combining the advantages related to turbojet engine nacelles with movable cascade vane thrust reversers, on the one hand, and the advantages associated with nacelles having a variable section jet nozzle on the other hand.

To that end, the present disclosure provides a turbojet engine nacelle comprising a fixed part comprising a fan cowl and a front frame suitable for being fixed downstream from a fan casing of said turbojet engine on the one hand, and on the other hand, thrust reverser means comprising:
  a reverser cowl whereof the downstream part forms a jet nozzle;
  cascade vanes fixed upstream from the reverser cowl;
  thrust reverser flaps;
  actuating means,
  said thrust reverser means being translatable under the effect of said actuating means between at least one retracted position of the reverser cowl corresponding to a folded position of said thrust reverser flaps for operation of the nacelle in direct jet mode, and a deployed position of the reverser cowl corresponding to a deployed position of said thrust reverser flaps for operation of the nacelle in reverse jet mode, said nacelle being remarkable in that the stretching of said actuating means results in causing a variation in the nozzle section as long as said stretching is below a predetermined value, and exposing the cascade vanes and deploying the thrust reverser flaps so as to perform the reverse jet function beyond said predetermined value.

Owing to the present disclosure, a single set of actuators makes it possible, first and in a retracted position of the thrust reverser member, to vary the nozzle section, then, secondly, to reverse the thrust of the reactor.

Using such a device, the function for varying the section of the jet nozzle and the thrust reversal function are performed by means of a single set of actuators, since that assembly makes it possible to move the thrust reverser means in concert, such a movement resulting in first performing the jet nozzle varying function, then performing the thrust reversal function.

Advantageously, the fan cowl is configured to partially cover the upstream edge of the reverser cowl, during stretching of the actuating means below said predetermined value.

This makes it possible to provide aerodynamic continuity between the fixed member and moving member of the nacelle.

Furthermore and advantageously, the thrust reverser flaps are capable of extending upstream from the upstream edge of the fan casing, when the nacelle is in direct jet operation.

Such a position of the reverser flaps during a direct jet operation of the nacelle allows significant space gains, thereby reducing the total length of the nacelle and therefore the weight, which consequently reduces manufacturing cost of the nacelle.

To that end, the thrust reverser flaps cover part of the fan casing of the turbojet engine when the nacelle is in direct jet operation.

According to the present disclosure, the fan casing and the fan cowl form a cavity containing the cascade vanes, for any movement of the actuating means below the predetermined value.

According to another form of the present disclosure, the thrust reverser flaps receive, on their convex side, at least one transverse pressure seal and at least one longitudinal pressure seal, said pressure seals providing sealing in the direct jet position between the thrust reverser flaps and the reverser cowl.

According to still another form, at least one pressure seal is fixed downstream from the fan casing, providing, during direct jet or reverse jet operation of the nacelle, the sealing between the cold air tunnel and the middle section.

According to these advantageous arrangements of the present disclosure, the pressure seals make it possible to provide sealing of the cold air tunnel during direct jet use of the nacelle for all of the positions of the downstream part 7.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
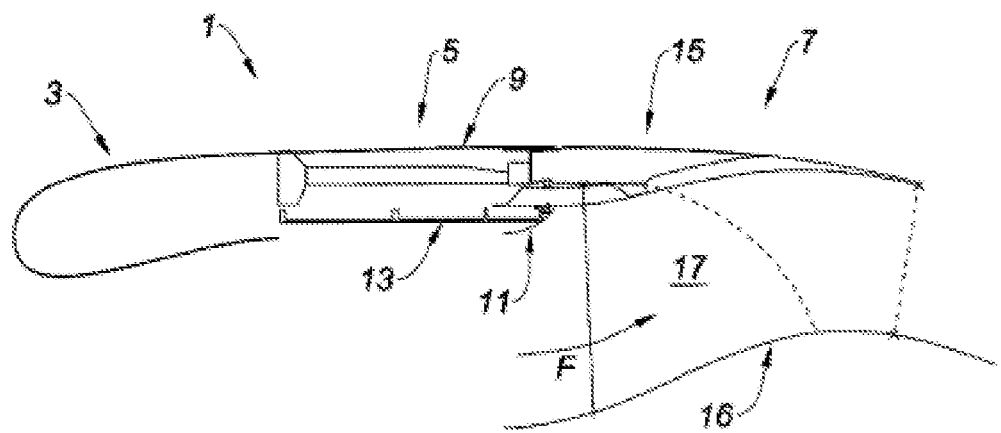
FIG. 1 shows a partial cross-sectional view of an aircraft nacelle according to the present disclosure, in direct jet operation.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In reference to FIG. 1, a nacelle 1 is designed to constitute a tubular housing for a dual flow turbojet engine and serves to channel the flows of air that it generates by means of the blades of a fan (not shown), i.e., a hot air flow passing through the combustion chamber and a cold air flow circulating outside the turbojet engine.

The nacelle 1 generally has a structure comprising an upstream section 3 forming an air intake, a fixed middle section 5, and a downstream section 7 surrounding the turbojet engine.

The middle section 5, fixed part of the nacelle 1, is formed by a fan cowl 9 and a front frame (not shown) comprising a fixed deflecting edge 11 providing the aerodynamic line with the downstream part of a fan casing 13 surrounding the fan of the turbojet engine (not shown).

The downstream section 7 comprises thrust reverser means 15 and an inner fairing structure 16 of the engine defining, with the thrust reverser means 15, a tunnel 17 designed for the circulation of a flow of cold air F from the turbojet engine.

The thrust reverser means 15 are translatable in a substantially longitudinal direction of the nacelle 1.

Figure 2:
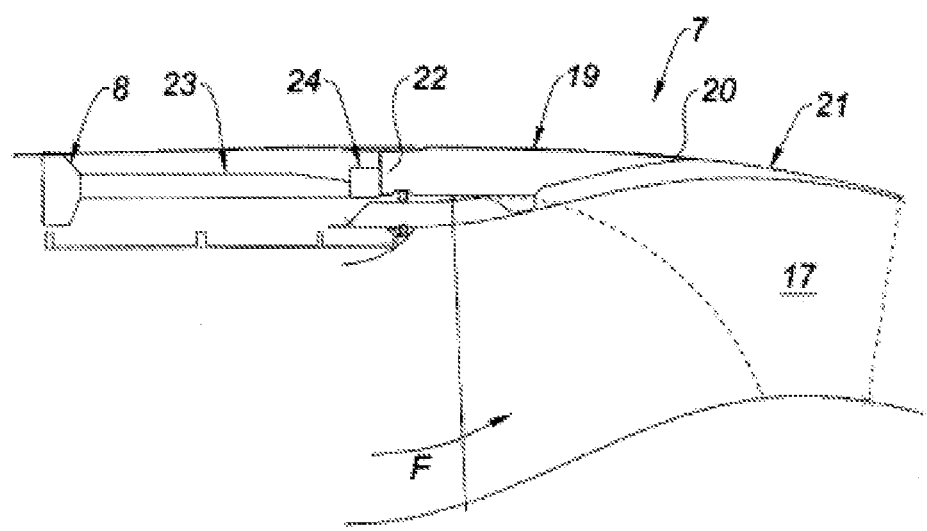
FIG. 2 is a detailed view of FIG. 1, centered on the middle and downstream sections of the nacelle according to the present disclosure.

In reference to FIG. 2, the thrust reverser means comprise a reverser cowl 19, whereof the downstream part 20 forms a jet nozzle 21 and the upstream part 22 is secured to a rear vane frame 24, and multiple cascade vanes 23 fixed, in the downstream part, to an upstream part of the reverser cowl 19 by means of the rear frame 24 and, at their upstream part, to a movable front frame 8.

Figure 3A:
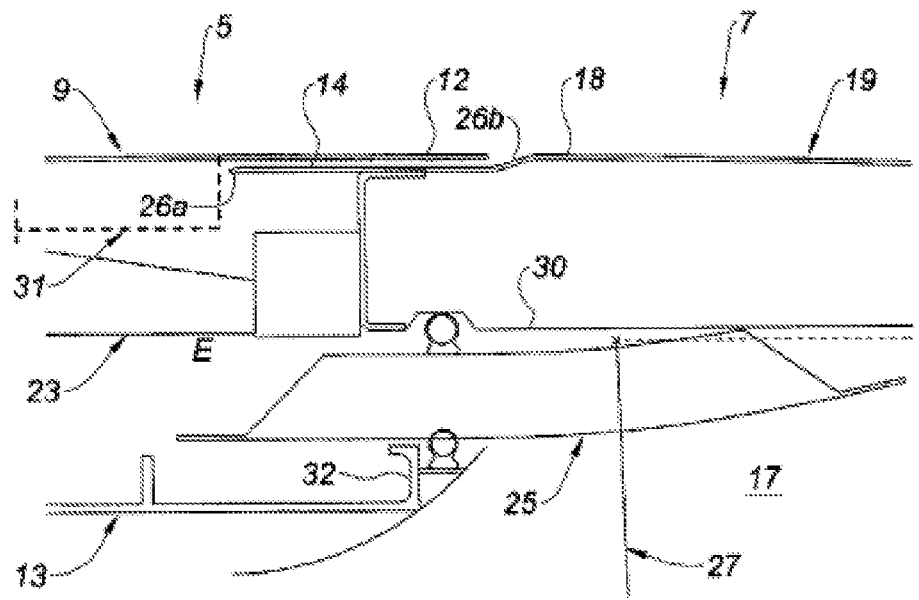
FIGS. 3a and 3b show a partial cross-sectional view of the overlap of the reverser cowl by the fan cowl, when the reverser cowl is in a retracted position and a downstream position, respectively.

In reference to FIG. 3, in direct operation, i.e., when the secondary air flow F of the turbojet engine of the nacelle 1 circulates freely in the tunnel 17, the aerodynamic continuity of the outer lines 10 of the downstream section 7 and the middle section 5 is provided owing to the downstream part 12 of the fan cowl 9 that overlaps the upstream edge 14 of the outer panel 18 of the thrust reverser 19.

In this respect, said upstream edge 14 of the outer panel 18 of the reverser cowl is profiled so as to more easily accommodate a misalignment of the downstream part 12 of the fan cowl 9 and the upstream edge 14 of the outer panel 18 of the reverser cowl 19. Said upstream edge 14 of the reverser cowl 19 can advantageously include a spoke 26a at its upstream end.

According to one form, guide rails 31 may be provided between the cascade vanes 23 and the fan cowl 9 to reduce the positioning gap between the fan cowl 9 and the reverser cowl 19.

Furthermore, the upstream edge 14 of the outer panel 18 of the reverser cowl 19 advantageously includes a spoke 26b making it possible to reduce the aerodynamic losses.

Advantageously, when the reverser cowl 19 is in a retracted position, corresponding to a direct jet operation of the nacelle 1, the cascade vanes 23 are housed in a cavity E formed by the fan casing 13 and the fan cowl 9.

The cascade vanes 23 are inactive when the reverser cowl 19 is in such a retracted position, and make it possible to reorient, toward the upstream direction of the nacelle 1, at least part of the cold air flow F circulating in the tunnel 17 when said reverser cowl 19 is in a deployed position corresponding to a reverse jet operation of the nacelle (see FIG. 4b below).

In order to increase the secondary air flow portion after passing through the vanes when the reverser cowl 19 is in a deployed position, the thrust reverser means 15 also comprise multiple thrust reverser flaps 25, distributed on the inner circumference 30 of the reverser cowl 19.

During direct operation of the nacelle, the thrust reverser flaps 25 are in the retracted position and ensure the inner aerodynamic continuity of the tunnel 17.

Each thrust reverser flap 25 is mounted pivoting around a transverse hinge pin secured to the cowl 19, and is capable of pivoting from said retracted position to a deployed position in which, in a thrust reversal situation, it at least partially closes off the tunnel 17 so as to deflect a secondary air flow F' toward the cascade vanes 23 (see FIG. 4b below).

Figure 4A:
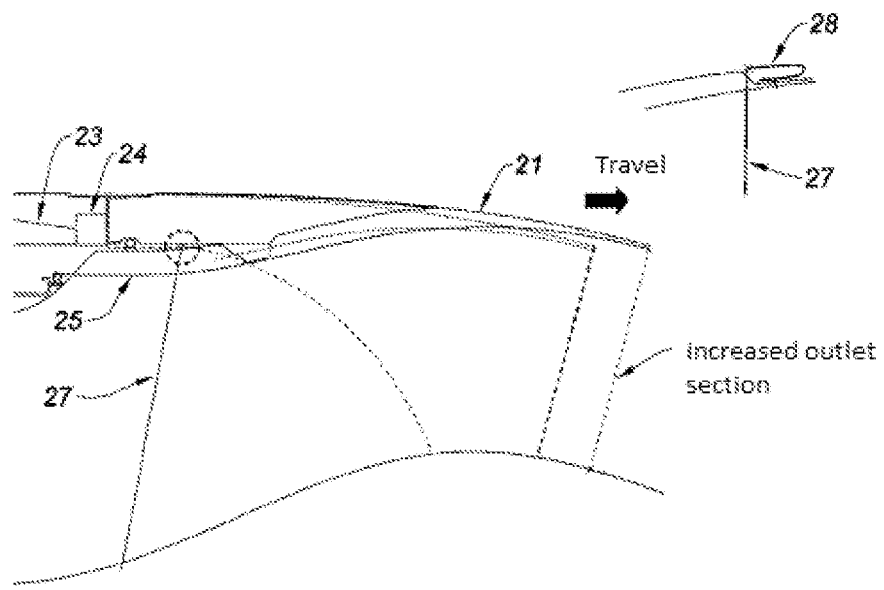
FIG. 4a shows a partial cross-sectional view of the nacelle according to the present disclosure during a phase for increasing the jet nozzle section.

In reference to FIG. 4a, such an installation may be done traditionally using a set of connecting rods 27 ending with a spring leaf 28.

The reverser flaps 25 extend in the upstream part of the downstream edge 32 of the fan casing 13 when said flaps are in the folded position, corresponding to a direct jet operation of the nacelle 1.

This arrangement according to the present disclosure advantageously makes it possible to reduce the size of the nacelle.

The reverser means 15 also comprise a set of actuating means (not shown) capable of allowing the translation of the reverser cowl 19. These actuating means are known by those skilled in the art and will not be described in more detail hereinafter. The movement of the reverser cowl 19 can thus be done through a rail/slide system known by those skilled in the art, or any other suitable actuating means comprising at least one electric, hydraulic or pneumatic linear actuator.

According to the present disclosure, the actuating means (not shown) stretch so as to move the reverser cowl 19 from a retracted position toward a downstream position of the nacelle 1.

During that phase, the reverser flaps 25 are kept in the retracted position owing to the spring leaf 28, which prevents said flaps from pivoting as long as the stretching of the actuating means is below a certain value, called predetermined value.

In such a configuration, i.e., as long as the stretching of said actuating means is below said predetermined value, the stretching of the actuating means will result solely in moving the reverser cowl 19, the cascade vanes 23, the rear vane frame 24 and the flaps 25 downstream from the nacelle 1 in concert, without deploying the flaps 25 remaining in the retracted position owing to the spring 28.

Thus, during such stretching of the actuating means, i.e., for stretching of the actuating means below said predetermined value, the movement of the reverser cowl 19 causes an increase in the jet nozzle section 21 (due to the particular profile of the engine fairing 16) while preserving the direct jet operation of the nacelle 1.

Figure 3B:
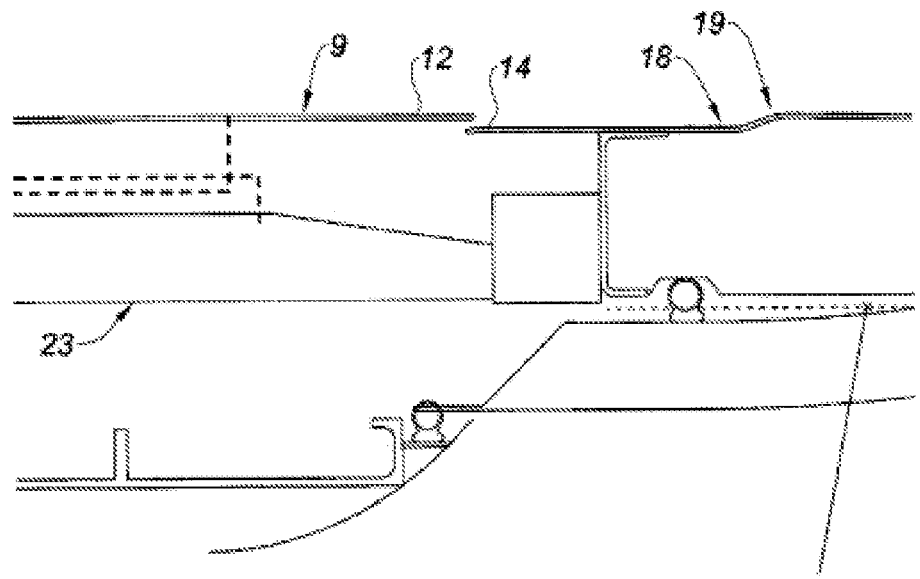

In reference to FIG. 3b, when the reverser cowl 19 translates from a retracted position to a downstream position of the nacelle 1 in direct jet operation, in order to increase the jet nozzle section 21, the aerodynamic continuity of the outer lines 10 of the downstream section 7 and the middle section 5 remains guaranteed owing to the downstream part 12 of the fan cowl 9, which partially overlaps the upstream edge 14 of the outer panel 18 of the reverser cowl 19, such that the cascade vanes 23 are still covered by said downstream part 12 of the fan cowl 9.

Figure 4B:
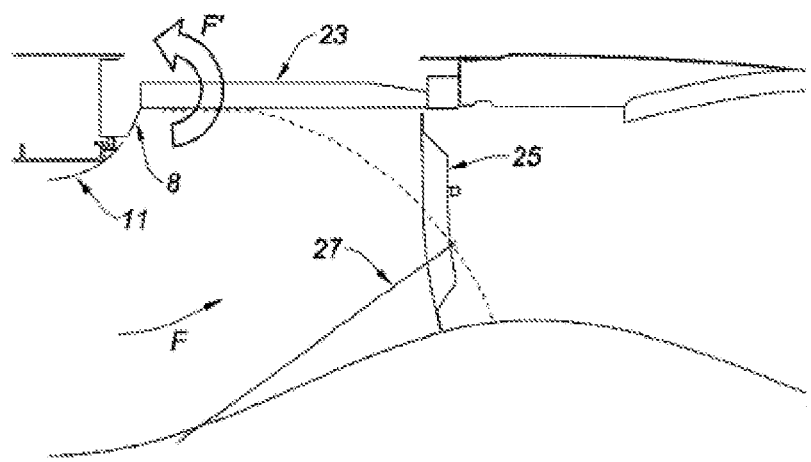
FIG. 4b shows a partial cross-sectional view of the nacelle according to the present disclosure in the reverse jet operation.
Figure 5:
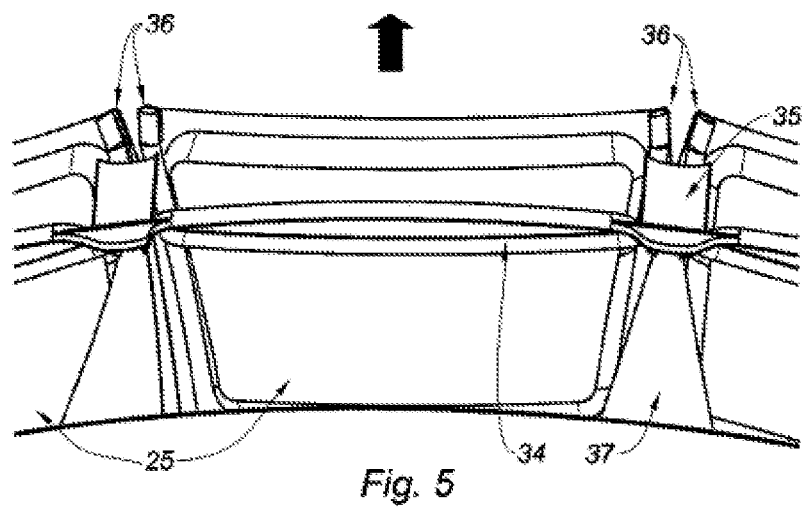
FIGS. 5 to 8 are perspective views illustrating the sealing devices equipping the nacelle according to the present disclosure.
Figure 6:
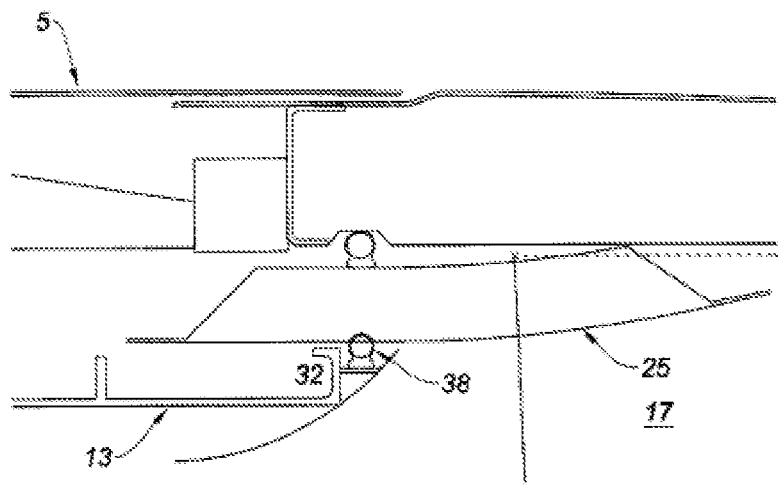
Figure 7:
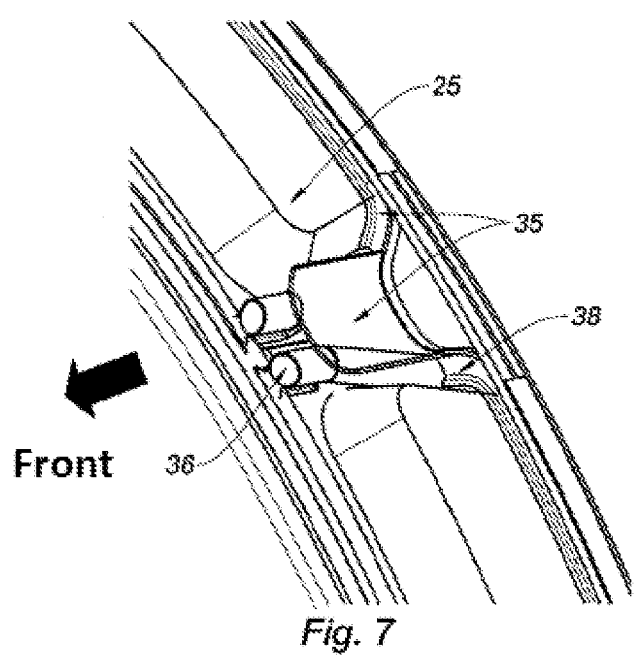
Figure 8:
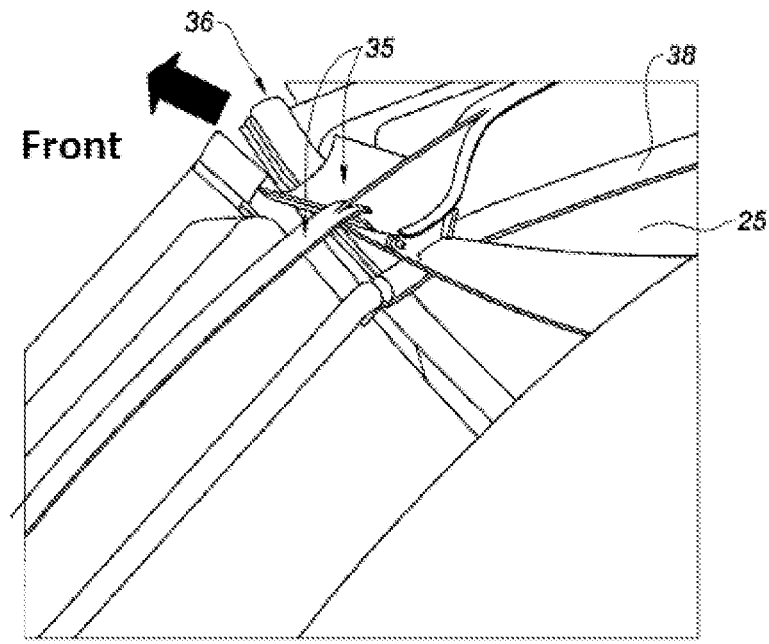

In reference to FIG. 4b stretching the actuating means beyond the aforementioned predetermined value results in moving the reverser cowl 19 toward a downstream position of the nacelle 1 and, the reverser cowl 19 being secured to the cascade vanes 23 and reverser flaps 25, exposing the cascade vanes 23.

Thus, each flap 25 is in a deployed position and contributes to reorienting part "F" of the secondary air flow "F" toward the cascade vanes 23, which orient the air flow "F" toward the upstream position of the nacelle 1.

Advantageously, the movable front frame 8 and the deflecting edge 11 are aligned, providing improved guiding of the secondary air flow "F" toward the cascade vanes 23.

The nacelle is then in the reverse jet configuration and the deflecting means 23 then orient the air flow "F" toward the upstream direction of the nacelle 1.

In reference to FIGS. 5 to 8, according to one form of the present disclosure, the thrust reverser flaps 25 receive, on their convex side, at least one transverse pressure seal 34 and at least one longitudinal pressure seal 36.

"Transverse" refers to a direction substantially perpendicular to the secondary air flow "F" circulating in the tunnel 17.

"Longitudinal" designates a direction substantially parallel to the secondary air flow "F" circulating in the tunnel 17.

These pressure seals 34 and 36 are designed to be compressed, when the flaps are in the folded position, against a set of seal-bearings 35 and against inter-flaps 37, respectively, said seal-bearings and inter-flaps both being secured to the reverser cowl 19.

These pressure seals make it possible to provide sealing between the thrust reverser flap 25 and the reverser cowl 19 during the direct jet use of the nacelle 1.

Advantageously, the device according the present disclosure also comprises a pressure seal 38 fixed downstream from the fan casing 13.

In the direct jet position, the reverser flaps 25 extend partially upstream from the downstream edge 32 of the fan casing 13; in that position, the concave side of the flap 25 bears on the pressure seal 38, the sealing between the tunnel 17 and the middle section 5 then being guaranteed.

In the reverse jet position, the movable front frame 8 and the deflecting edge 11 are aligned for improved guiding of the secondary air flow "F" toward the cascade vanes 23; the pressure seal 38 guarantees sealing between the tunnel 17 and the middle section 5 so that the secondary air flow "F" is maximal.

Owing to the present disclosure, one has a nacelle combining the advantages inherent on the one hand to movable cascade thrust reversers, and on the other hand to variable nozzle thrust reversers.

The nacelle according to the present disclosure thus offers the advantage of reducing the length and thickness of the aerodynamic lines of the nacelle owing to the movable vanes.

The nacelle according to the present disclosure also resolves the problems related to the complexity of such manufacturing, since a single degree of translational freedom makes it possible to perform both the jet nozzle varying function and the thrust reversal function.

The present disclosure is of course not limited solely to the forms of this nacelle described above as examples, but on the contrary encompasses all alternatives.

What is claimed is:

1. A turbojet engine nacelle comprising a fixed part, a movable front frame, and thrust reverser means, the fixed part comprising a fan cowl which is fixed downstream from a fan casing of a turbojet engine, said thrust reverser means comprising:
a reverser cowl, a downstream part of the reverser cowl forms a jet nozzle;
cascade vanes fixed upstream from the reverser cowl;
thrust reverser flaps; and
an actuator, said thrust reverser means being translatable by the actuator between at least one retracted position of the reverser cowl corresponding to a folded position of said thrust reverser flaps for operation of the nacelle in a direct jet mode, and a deployed position of the reverser cowl corresponding to a deployed position of said thrust reverser flaps for operation of the nacelle in a reverse jet mode, wherein a movement of the actuator below a predetermined value results in causing a variation in a nozzle section of the jet nozzle, wherein when the actuator is moved, the reverser cowl, the cascade vanes, and the thrust reverser flaps are moved in concert downstream from the fixed part of the nacelle without deploying the thrust reverser flaps, and movement of the actuator beyond the predetermined value results in exposing the cascade vanes and deploying the thrust reverser flaps for operation of the nacelle in the reverse jet mode, and wherein the movable front frame and a fixed deflecting edge are aligned with the cascade vanes in the reverse jet mode thus improving guiding of a secondary air flow toward the cascade vanes.

2. The turbojet engine nacelle according to claim 1, wherein the fan cowl is configured to partially cover an upstream edge of the reverser cowl, during the actuator is stretched, and the reverser cowl, the cascade vanes, and the thrust reverser flaps are moved in concert downstream from the fixed part of the nacelle.

3. The turbojet engine nacelle according to claim 1, wherein the thrust reverser flaps extend upstream from a downstream edge of the fan casing, when the nacelle is in the direct jet mode.

4. The turbojet engine nacelle according to claim 1, wherein the fan casing and the fan cowl form a cavity containing the cascade vanes, for any movement of the actuator below a predetermined value.

5. The turbojet engine nacelle according to claim 1, wherein the thrust reverser flaps receive, on a convex side thereof, at least one transverse pressure seal and at least one longitudinal pressure seal, said pressure seals providing sealing in the direct jet mode between the thrust reverser flaps and the reverser cowl.

6. The turbojet engine nacelle according claim 1, wherein at least one pressure seal is fixed downstream from the fan casing, providing, during direct jet or reverse jet operation of the nacelle, the sealing between a cold air tunnel and the fixed part.

* * * * *